United States Patent
Woo et al.

(10) Patent No.: US 11,423,596 B2
(45) Date of Patent: *Aug. 23, 2022

(54) SYSTEM AND METHOD FOR GENERATING EMOJI MASHUPS WITH MACHINE LEARNING

(71) Applicant: PayPal, Inc., San Jose, CA (US)

(72) Inventors: Titus Woo, San Jose, CA (US); Wei Ting Kuo, San Jose, CA (US); Xueguang Lu, San Jose, CA (US); Venkatesh Komma, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,891

(22) Filed: Mar. 17, 2020

(65) Prior Publication Data

US 2020/0388061 A1    Dec. 10, 2020

Related U.S. Application Data

(63) Continuation of application No. 15/790,799, filed on Oct. 23, 2017, now Pat. No. 10,593,087.

(51) Int. Cl.
| | |
|---|---|
| *G06N 20/00* | (2019.01) |
| *G06T 11/60* | (2006.01) |
| *G06F 40/109* | (2020.01) |
| *G06F 40/166* | (2020.01) |
| *G06F 40/274* | (2020.01) |
| *G06V 10/44* | (2022.01) |
| *G06F 3/0482* | (2013.01) |

(Continued)

(52) U.S. Cl.
CPC ............ *G06T 11/60* (2013.01); *G06F 40/109* (2020.01); *G06F 40/166* (2020.01); *G06F 40/274* (2020.01); *G06N 20/00* (2019.01); *G06V 10/44* (2022.01); *G06F 3/0482* (2013.01); *G06F 40/242* (2020.01); *G06F 40/30* (2020.01); *G06T 2200/24* (2013.01)

(58) Field of Classification Search
None
See application file for complete search history.

(56) References Cited

U.S. PATENT DOCUMENTS

| | | |
|---|---|---|
| 8,401,248 B1 | 3/2013 | Moon et al. |
| 8,584,031 B2 | 11/2013 | Moore et al. |

(Continued)

FOREIGN PATENT DOCUMENTS

EP    1771002 A2    4/2007

OTHER PUBLICATIONS

International Appl. No. PCT/US2018/057164, International Preliminary Report on Patentability dated May 7, 2020, 8 pages.

(Continued)

*Primary Examiner* — Maikhanh Nguyen
(74) *Attorney, Agent, or Firm* — Haynes and Boone, LLP

(57) ABSTRACT

Aspects of the present disclosure involve systems, methods, devices, and the like for emoji mashup generation. The system and method introduce a method and model that can generate emoji mashups representative of contextual information received by a user at an application. The emoji mashup may come in the form of two or more emojis coherently combined to represent the contextual idea or emotion being conveyed.

14 Claims, 10 Drawing Sheets

(51) Int. Cl.
*G06F 40/30* (2020.01)
*G06F 40/242* (2020.01)

(56) References Cited

U.S. PATENT DOCUMENTS

| | | | |
|---|---|---|---|
| 8,781,991 B2* | 7/2014 | Lee | A61B 5/165 |
| | | | 706/52 |
| 9,043,196 B1 | 5/2015 | Leydon et al. | |
| 9,515,968 B2* | 12/2016 | Ebersman | H04L 51/32 |
| 9,794,202 B1 | 10/2017 | Pereira et al. | |
| 10,025,972 B2 | 7/2018 | Matas et al. | |
| 10,057,358 B2 | 8/2018 | Johnson et al. | |
| 10,084,738 B2 | 9/2018 | Venkatakrishnan et al. | |
| 10,438,223 B2 | 10/2019 | Griffen | |
| 10,685,186 B2* | 6/2020 | Gu | G06F 40/35 |
| 10,855,632 B2* | 12/2020 | Kennedy | G06K 9/00302 |
| 2004/0018858 A1 | 1/2004 | Nelson | |
| 2005/0143108 A1 | 6/2005 | Seo et al. | |
| 2005/0156873 A1 | 7/2005 | Walter et al. | |
| 2006/0015812 A1 | 1/2006 | Cunningham et al. | |
| 2008/0235285 A1* | 9/2008 | Della Pasqua | G06Q 10/107 |
| 2009/0254859 A1* | 10/2009 | Arrasvuori | G06Q 10/10 |
| | | | 715/810 |
| 2009/0300513 A1* | 12/2009 | Nims | A63F 13/5258 |
| | | | 715/747 |
| 2010/0179991 A1* | 7/2010 | Lorch | H04L 51/063 |
| | | | 709/206 |
| 2011/0248992 A1* | 10/2011 | van Os | G06T 11/60 |
| | | | 345/419 |
| 2011/0296324 A1* | 12/2011 | Goossens | G06F 3/04883 |
| | | | 715/763 |
| 2012/0059787 A1 | 3/2012 | Brown et al. | |
| 2012/0319985 A1 | 12/2012 | Moore et al. | |
| 2013/0159919 A1* | 6/2013 | Leydon | G06F 3/04812 |
| | | | 715/780 |
| 2014/0279418 A1 | 9/2014 | Rubinstein et al. | |
| 2015/0100537 A1* | 4/2015 | Grieves | G06F 3/0236 |
| | | | 706/52 |
| 2015/0277686 A1 | 10/2015 | Laforge et al. | |
| 2016/0110906 A1 | 4/2016 | Ahuja et al. | |
| 2016/0191958 A1 | 6/2016 | Nauseef et al. | |
| 2016/0291822 A1 | 10/2016 | Ahuja et al. | |
| 2016/0292148 A1 | 10/2016 | Aley et al. | |
| 2016/0343062 A1 | 11/2016 | Morton et al. | |
| 2016/0358207 A1 | 12/2016 | Montaque et al. | |
| 2017/0018289 A1* | 1/2017 | Morgenstern | G11B 27/036 |
| 2017/0052946 A1 | 2/2017 | Gu et al. | |
| 2017/0075878 A1 | 3/2017 | Jon et al. | |
| 2017/0083174 A1* | 3/2017 | Tobens, III | G06F 3/0485 |
| 2017/0118154 A1 | 4/2017 | Venkatakrishnan et al. | |
| 2017/0118189 A1 | 4/2017 | Venkatakrishnan et al. | |
| 2017/0124713 A1 | 5/2017 | Jurgenson et al. | |
| 2017/0140214 A1 | 5/2017 | Matas et al. | |
| 2017/0147185 A1 | 5/2017 | Milvaney et al. | |
| 2017/0154055 A1 | 6/2017 | Dimson et al. | |
| 2017/0161238 A1 | 6/2017 | Fang | |
| 2017/0177554 A1* | 6/2017 | Emmons | H04L 51/063 |
| 2017/0185580 A1* | 6/2017 | Zhang | G06F 3/0237 |
| 2017/0185581 A1 | 6/2017 | Bojja et al. | |
| 2017/0189641 A1 | 7/2017 | Moturu et al. | |
| 2017/0300462 A1 | 10/2017 | Cudworth et al. | |
| 2017/0336927 A1* | 11/2017 | Chaudhri | G06F 3/0481 |
| 2017/0344224 A1 | 11/2017 | Kay et al. | |
| 2017/0371522 A1 | 12/2017 | Martinez et al. | |
| 2018/0024726 A1 | 1/2018 | Hviding | |
| 2018/0024991 A1 | 1/2018 | Baldwin et al. | |
| 2018/0074661 A1 | 3/2018 | Zhao et al. | |
| 2018/0083898 A1 | 3/2018 | Pham | |
| 2018/0091732 A1 | 3/2018 | Wilson et al. | |
| 2018/0137529 A1 | 5/2018 | Griffin | |
| 2018/0167468 A1 | 6/2018 | Johnson et al. | |
| 2018/0227256 A1 | 8/2018 | Wilson | |
| 2018/0260385 A1 | 9/2018 | Fan et al. | |
| 2018/0314409 A1 | 11/2018 | Adilipour et al. | |
| 2018/0335930 A1 | 11/2018 | Scapel et al. | |
| 2018/0336715 A1 | 11/2018 | Rickwald et al. | |
| 2018/0356957 A1 | 12/2018 | Desjardins | |
| 2018/0373683 A1 | 12/2018 | Hullette et al. | |
| 2019/0096113 A1 | 3/2019 | Stukalov | |

OTHER PUBLICATIONS

International Appl. No. PCT/US2018/057164, International Search Report and Written Opinion dated Jan. 4, 2019, 8 pages.

"How to Convert Text to Emoji in Messages on iPhone", Jan. 6, 2017—12 Comments, OSXDaily, pp. 9 (Year: 2017).

Haider, Karrar in Mobile, "10 Tools to Create Custom Emoji", Nov. 26, 2017, pp. 10 (Year: 2017).

"Programming Snapchat-Like Filters", Nov. 28, 2017, pp. 55 (Year: 2017).

European Application No. 18870855.6, Extended European Search Report dated Jun. 18, 2021, 9 pages.

Olanoff D., "What in the Hell Is a #TacoEmojiEngine?", TechCrunch, Nov. 12, 2015, XP055812734, Retrieved from the Internet: https://techcrunch.com/2015/11/10/what-in-the-hell-is-a-tacoemojiengine/, Retrieved on (Jun. 10, 2021), 6 pages.

* cited by examiner

SYSTEM AND METHOD FOR GENERATING EMOJI MASHUPS WITH MACHINE LEARNING

CROSS REFERENCE TO RELATED APPLICATIONS

This application is a continuation of U.S. patent application Ser. No. 15/790,799, filed Oct. 23, 2017, issued as U.S. Pat. No. 10,593,087, which is incorporated by reference herein in its entirety.

TECHNICAL FIELD

The present disclosure generally relates to user device communication, and more specifically, to user device communication using emojis.

BACKGROUND

Nowadays with the evolution and proliferation of devices, users are constantly connected to the internet and social media as a means for communication. Oftentimes, in the communication the users resort to the use of emojis to express an emotion, an idea, place, event, etc. The emojis are often available for selection from the application in use and may be selected by the user. In some instances however, the emoji may appear in response to the word or group of words typed by the user. These emojis are often restricted to the emojis available to the application and/or constraint by the one or more words identified by the application that relate to an emoji. This however, may lead to an incorrect emoji being presented, as the emoji may not fit the occasion. In other words, the emoj is presented are constrained to the one or more words matched to the emoji. Thus, the sentiment or occasion as described by a sentence typed is not understood and the user instead resorts to a sticker or gif for the emotion. Therefore, it would be beneficial to create a system that can generate emojis that are tailored for the conversation.

Figure 1:
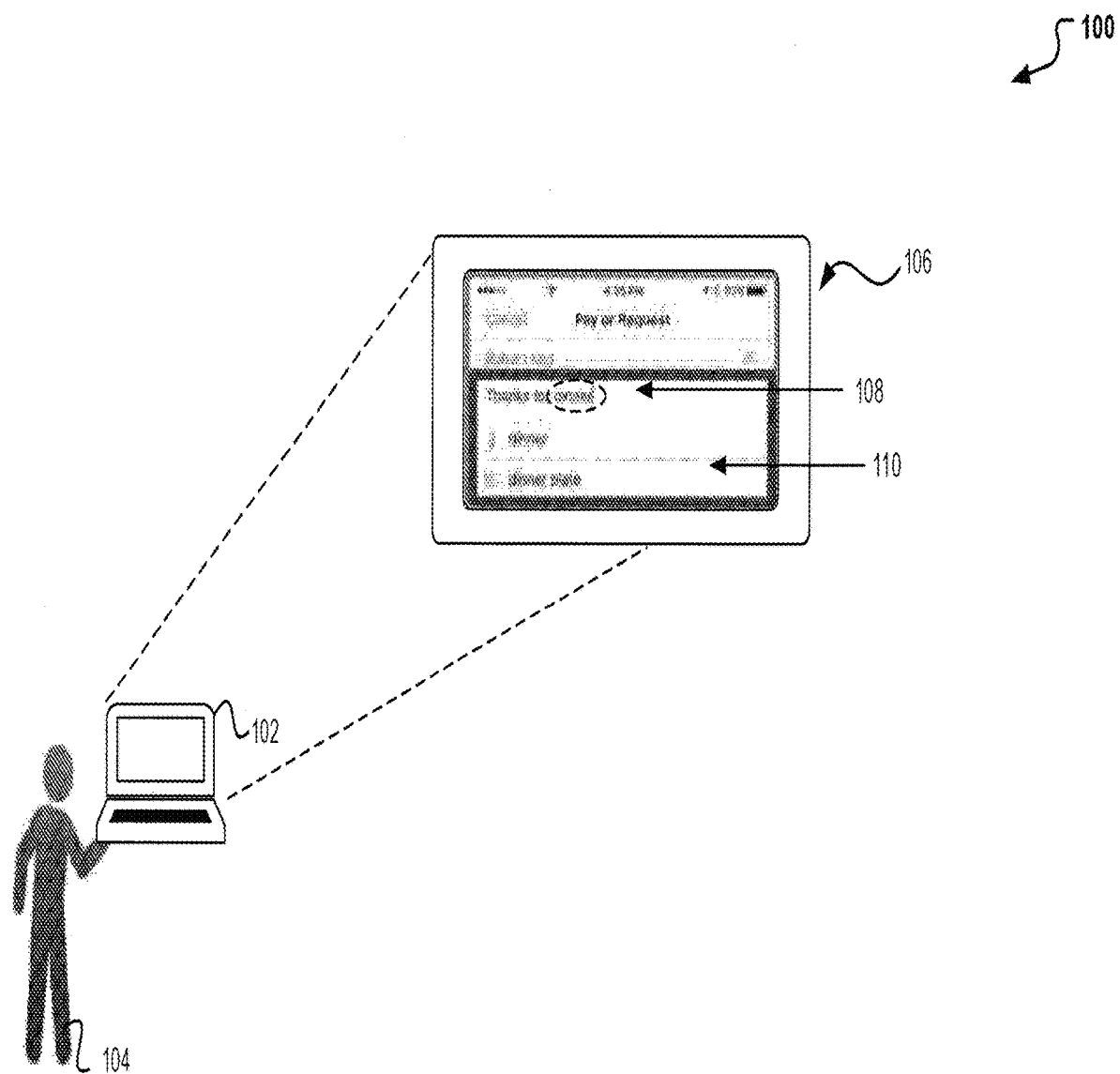
FIG. 1 illustrates a graphical diagram of a user communicating with a user device.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for emoji mashup generation. In one embodiment, a system is introduced that generates emoji mashups representative of contextual information received by a user at an application. The emoji mashup may come in the form of two or more emojis coherently combined to represent the contextual idea or emotion being conveyed.

Conventionally, device users have depended on predefined emojis for use in expressing emotions, ideas, or places. However, oftentimes, the user may be limited to those emojis available on the application. In some instances, the emoji available is further limited and presented in response to the recognition of one or more words being input/typed by the user. The emoj is presented however, may be out of context, as the presented emoj is are limited to those on the application and/or the correlation between the one or more words detected.

An example, FIG. 1 illustrates a graphical diagram 100 of a user 104 communicating with a user device 102. In particular, FIG. 1 illustrates a user 104 interacting with an application 106 on a user device 102. The user device 102 may include a smart phone, tablet, computer, laptop, wearable device, tablet, virtual reality system, etc. The user device 102 may be capable of communicating with one or more devices over one or more networks. In some instances, the user device 102 may include the interaction with an application for communicating over social media, communicating with another individual, transferring funds, processing transactions or the like. As illustrated, the user 104 may be interacting with the application (e.g., Venmo) over user device 102. The application (e.g., Venmo) 106 may include one that presents emojis in response to detecting a word(s) (e.g., dinner) that is correlated with the words detected. As an example, FIG. 1 illustrates user 104 interacting with Venmo with the indication that a payment will be made to a person (e.g., Robert Kuo) in response to a dinner outing. In the message, the user is thanking Robert for dinner and in response to the detection of the word dinner 108, emojis 110 that have been identified to correlate with the word dinner 108 appear. In the example, the application recognizes the word dinner 108 and in response silverware and dinner plate emojis 110 are presented. A disadvantage however, as illustrated, is that word-to-emoji type matching is limited by the correlations that the system has and corresponding emojis 110 available for selection.

In one embodiment, a system and method is introduced that enables emoji mashups with machine learning. That is to say, a system and method are introduced that enable the ability to combine two or more emojis to generate at least a single emoji that represents more than a single word or words, but instead a sentence and/or the context involved in a communication.

Figure 2:
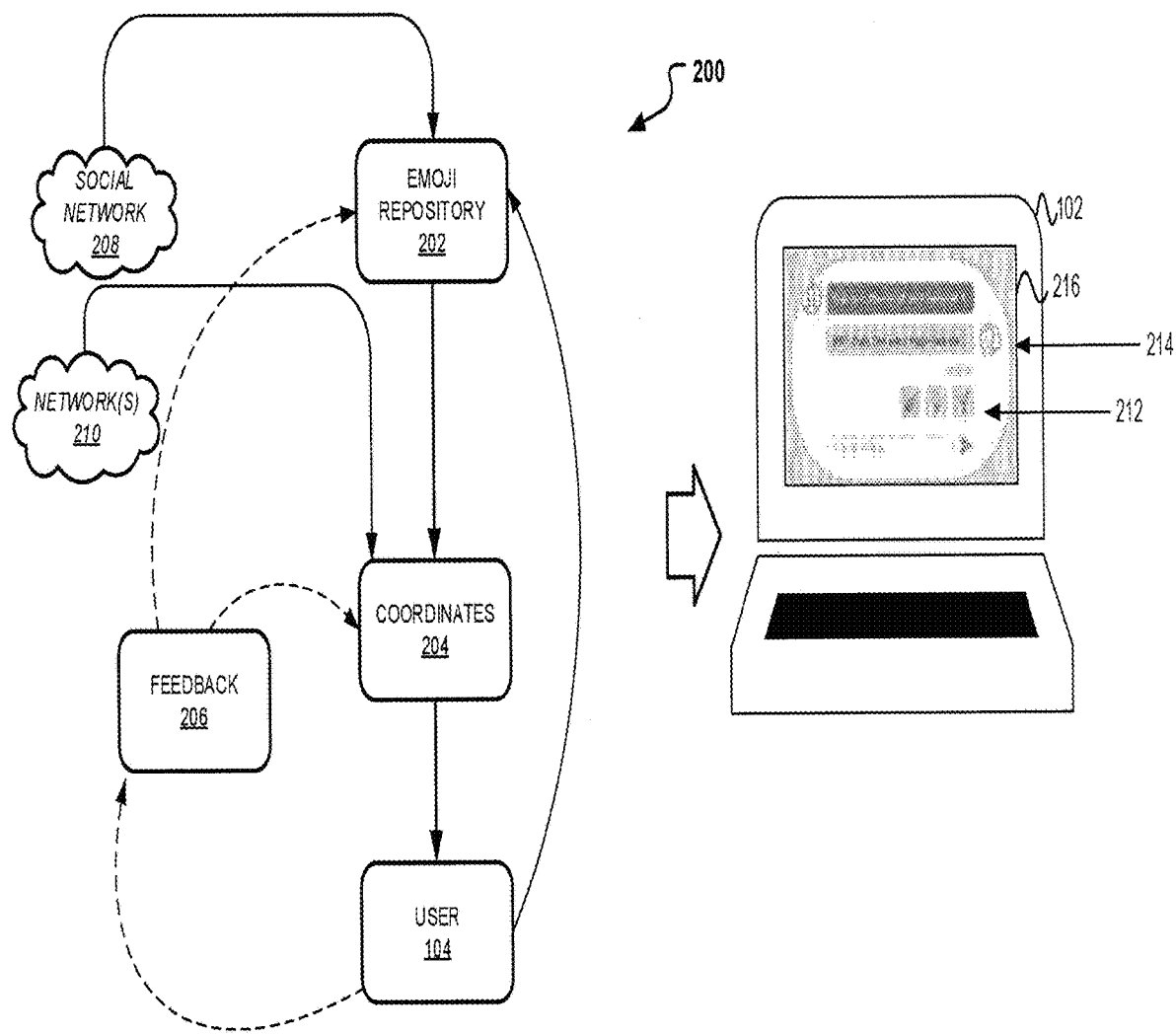
FIG. 2 illustrates a graphical diagram of user device communication using emoji mashup.

FIG. 2 illustrates a graphical diagram of user device communication using emoji mashup. In particular FIG. 2 illustrates a flow diagram 200 for generating emoji mashups that may then be presented on a user interface of an application 106 on a user device 102.

As indicated above, a large limitation exists in current emojis used, based in part, on the partial library that may be available on the application as well as the strict emoji-word designation based on predefined correlations. Flow diagram 200 is presented as an exemplary communication that can occur between various systems that can enable the generation of emoji mashups that are more closely related to the contextual information on the message at the time.

For example, as illustrated in flow diagram 200, an emoji repository/system 202 that may be in communication with external networks 210 including social networks 208 (e.g., Twitter, Facebook) may be used. These networks can communicate and share emojis available that may be used by the user device 102 during an interaction with another user (e.g., a Venmo transaction). The flow diagram also illustrates a coordinate system 204 that may be in communication with at least the user device 104 and external networks 210. The coordinate system 204 can be a system that uses the emoji details gathered from the user device 102, social networks 208, and other external networks 210 to determine how to best locate the two or more emojis that become the emoji mashup 212 and/or to extract coordinate information from two or more emojis to determine how to best place the emojis with respect to each other in response to the contextual information gathered during the user device interaction with the another user.

The coordination, repository and use of intelligent algorithms work jointly to generate the new emoji mashup. Feedback from user input is also used to learn and identify the best matches as well as identify new emoji mashups 212. To illustrate the idea of emoji mashup 212, FIG. 2 includes a conversation on a display 216 on user device 102. As an example, on the display 216, user 104 is communicating with another user regarding a concert that was attended. The other user comments on the concert and how well it went while user 104 responds with, "IKR?! Dude, Dan was a friggin rock star . . . ." In response the user's comments 214, emoji mashups 214 are presented which are suggested in response to the context in the conversation.

Notice that unlike conventional systems where the word "rock" or "star" would be recognized and a rock or star would be suggested, here instead more relevant emoji mashups 214 are suggested. For example, a guitar and a star are combined, a rock&roll emoji and stars are combined, and a trophy and music notes are combined. Thus, the emoji mashup 214 presents an emoji that represents the idea and/or emotion in a more comprehensive manner.

Figure 3:
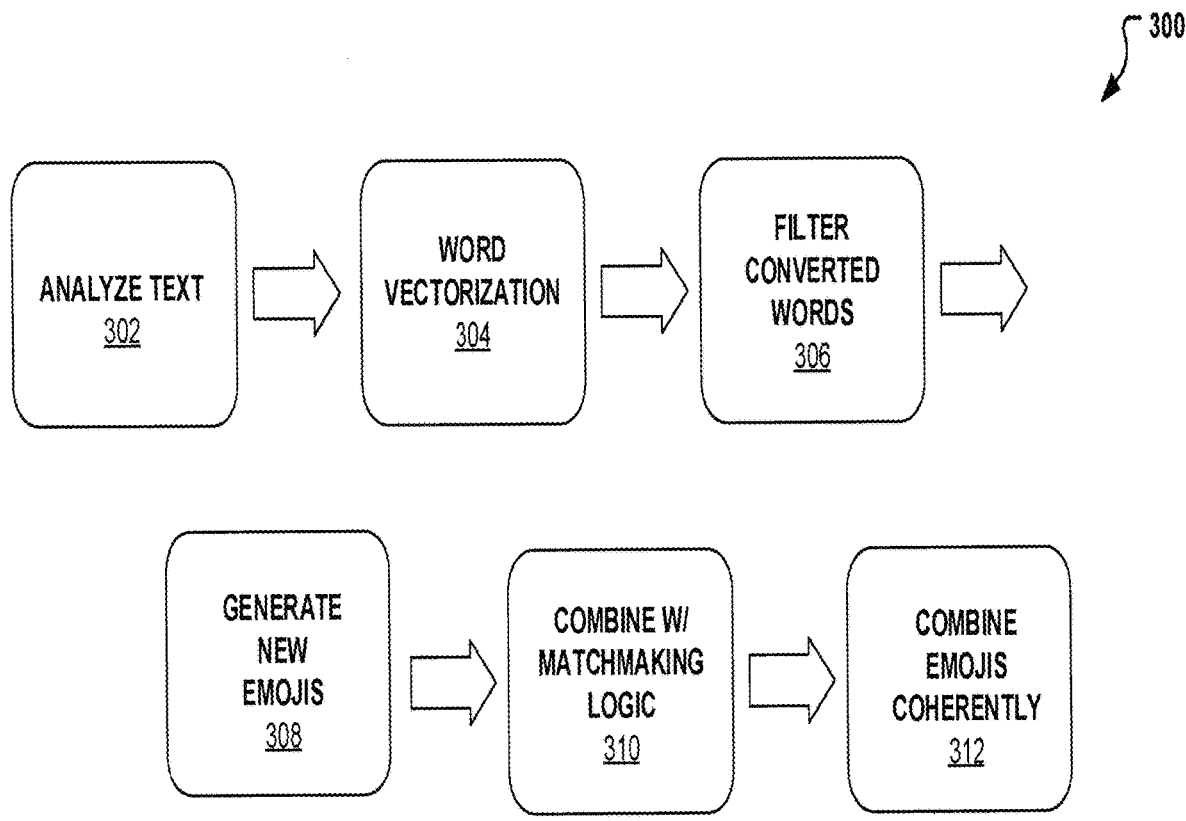
FIG. 3 illustrates a block diagram of a system for the overall process for generating emoji mashups with machine learning.
Figure 4:
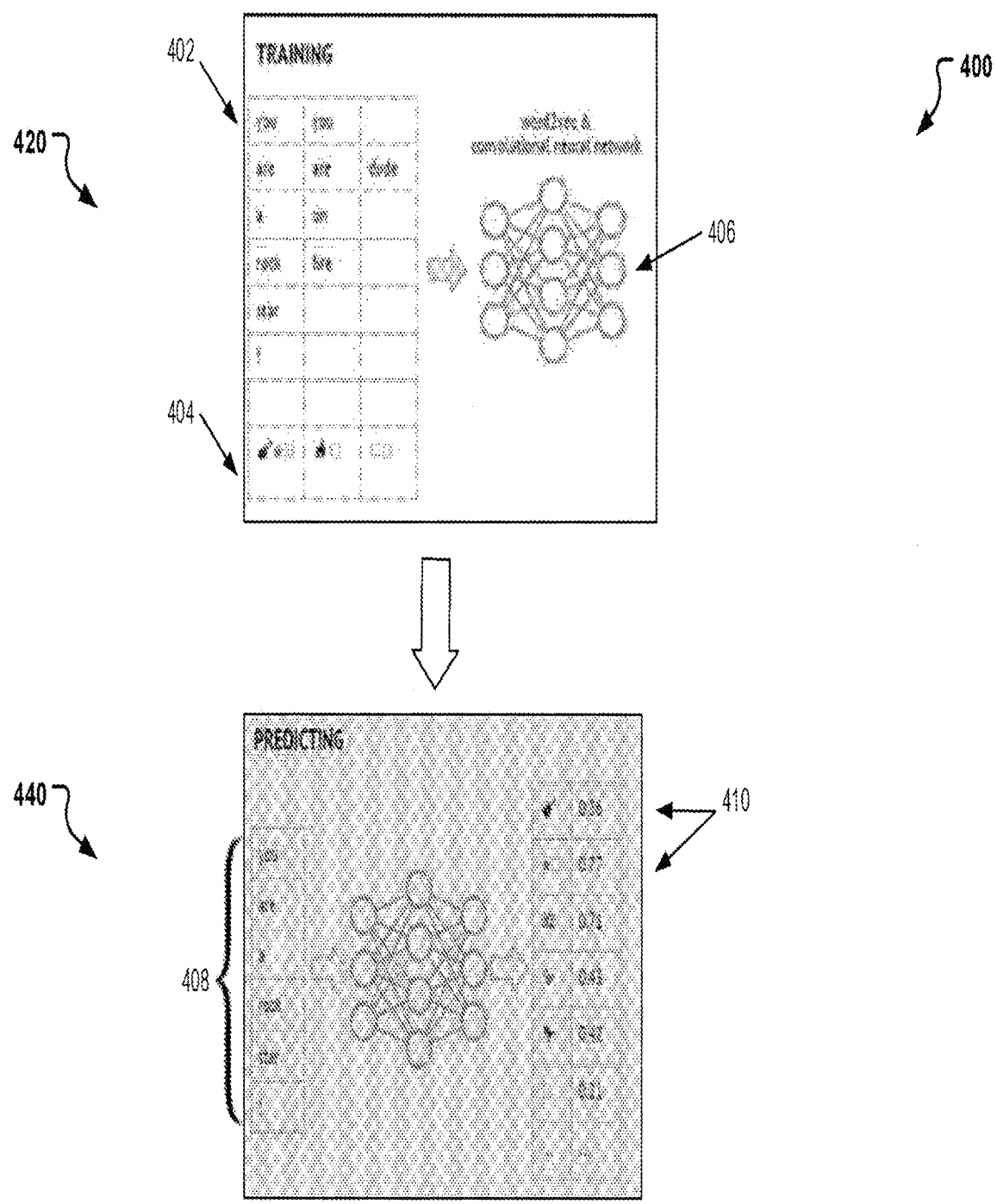
FIG. 4 illustrates a block diagram exemplifying a training and predicting method for generating emoji mashups with machine learning.

Turning to FIG. 3, a more detailed description of the overall process for generating the emoji mashup 214 is presented. In particular, FIG. 3 illustrates a block diagram of a methodology 300 for generating emoji mashups. Methodology 300 presents the model that may be used for retrieving, analyzing, and training information received for suggesting an emoji mashups 212. Methodology 300 can begin with first analyzing the text 302 received by the application. As indicated above, an aspect of the current embodiment includes retrieving mashup emojis 212 that closely correlate with the contextual information received. Analyzing the text can include taking the message transmitted and evaluating the contextual information to identify the words transmitted. In addition, the information can also be run through a system and method of evaluating the context which includes word vectorization 304. Word vectorization 304 is a method that uses computational intelligence including neural networks and natural language processing for generating dictionaries from words into real-valued vectors. The process which includes converting a bitmap image into a vector representation such that terms are given a corresponding number such that the closer the words are in relationship to each other the closer the numerical number between the words. As an example, the words can be vectorized to find similar meanings using language models to extract word functions and structure. FIG. 4 and its corresponding description below provides an example of word vectorization. In addition to vectorization, the information may be sent through a sentiment analyzer where clues about the message tone, purpose, and context may be used in the analysis.

After the words are vectorized, the words can be filtered 306. The filtered vectors may be converted into matrices which can be used to programmatically generate new emojis 308. The new emojis generated can be emojis identified from social networks, system repositories, other networks, etc. Once the new emojis are generated and/or retrieved, the emojis are combined. Combining the emojis can occur by using matchmaking logic 310. The matchmaking logic can include coordinates, image recognition systems, as well as machine learning algorithm which can be used to learn and/or determine how to combine the emojis coherently 312. For example, coordinates from each set of emojis retrieved or generated 308 can be analyzed to determine their corresponding center to determine how to best combine. Once one or more emojis are combined to generate emoji mashups 212, the emojis can be presented to the user 104 for selection.

To illustrate methodology 300, consider a user 104 whose input includes "Dude, you're on fire!" For such input, methodology can use word vectorization and sentiment analysis to determine that the communication includes a positive sentiment and smiley face and flame emoji can be retrieved. Once these two emojis are retrieved, the matchmaking algorithm can be used to determine how to scale and place the emojis relative to each other. In one embodiment, the face emoji may be placed prominently in front of the flame emoji which can sit behind on by the head portion of the face. Additionally, a refresh button may be available which can be used to generate a new emoji mashup. Thus, with the use of the external networks, user feedback, and system userbase (e.g., Paypal/Venmo userbase), machine learning and neural networks may be used to generate new and improved emoji mashups 212 over time.

To illustrate some of the processes involved in methodology 300 for generating the emoji mashups 212, FIGS. 4-5 are included. Turning to FIG. 4, word training and prediction is illustrated. In particular, FIG. 4 illustrates a block diagram 400 exemplifying a training and predicting method for generating emoji mashups with machine learning.

As previously indicated, word vectorization 304 is a technique that may be used in the text analysis for identifying and predicting emojis based on the written text. As an example of how word vectorization may occur, word2vec training model is presented in FIG. 4. Word2vec is a model that may be used to illustrate a model that may be used to learn to map discrete words into a low-dimensional vector. Generally, word2vec may be an algorithm that may comprise at least two models that are trained to predict relationships. In particular, vector space models such as word2vec enable words to be represented in a continuous vector space such that similar words are maps to nearby data points through the use of machine learning. As an example, consider the word "animal", the data point assigned to it will be very similar to that which would be assigned to a word like "cat" or "dog." As another example, the word "man" would have a closer value to "king" than the word "queen." In some instances, an open source library may be used to obtain these values.

Returning to FIG. 4, an illustration of the implementation of the word2vec model is illustrated. Note that the word2vce model in the current embodiment is used to train the entire sentence. Unlike conventional systems which simply map to a single word, the current system learns the entire sentence 402 in order to predict the two or more emojis that best represent the idea or emotion being communicated. As an example, training diagram 420 illustrates the sentence "you are a rock star" such that the system presents the guitar and star as a suggestion. This training process continues for commonly used phrases and statements and builds as the communication, suggestion and feedback is received from the user. Again, the training and emojis are suggested based using machine learning algorithms, libraries, databases, and models including but not limited to word2vec, open source libraries and databases, convolutional neural networks, supervised learning, clustering, dimensionality reduction, structured prediction, decision tree learning and the like. As the phrases/sentences are learned, the system may begin making predictions as illustrated in predicting diagram 440. Notice that now the system recognizes the trained sentence 408, "You are a rock star!" and produces various emoji suggestions with corresponding data points 410 with the suggestion of a guitar and a star receiving the highest data points of 0.86 and 0.77 respectively. Once the emojis are identified or new emojis generated 308, as indicated above, the method continues to combine the emojis using matchmaking logic.

A large part of the matchmaking logic includes determining how to merge the emojis. In one embodiment, to determine how to merge the emojis, object recognition is used to determine what the image is and an optimal location to merge. For example, if the two emojis identified include a smiley face and fire in response to "Dude you are on fire!" understanding how to merge the smiley face and the fire is determined using object recognition. To accomplish this, in one embodiment, the system can perform a center of mass like analysis to determine where the center of the object is. In another embodiment, the system can recognize the object (e.g., smiley face and fire images) and extract their coordinates. In one example, the dimensions may be pulled from the object while in other instances, the images may be turn a determined amount such that depth is provided to the image and coordinates can be extracted. The coordinates can then be provided to the matchmaking logic which can in-turn and suggest various ways to merge the two images detected (e.g., smiley face and fire emojis).

Figure 5A:
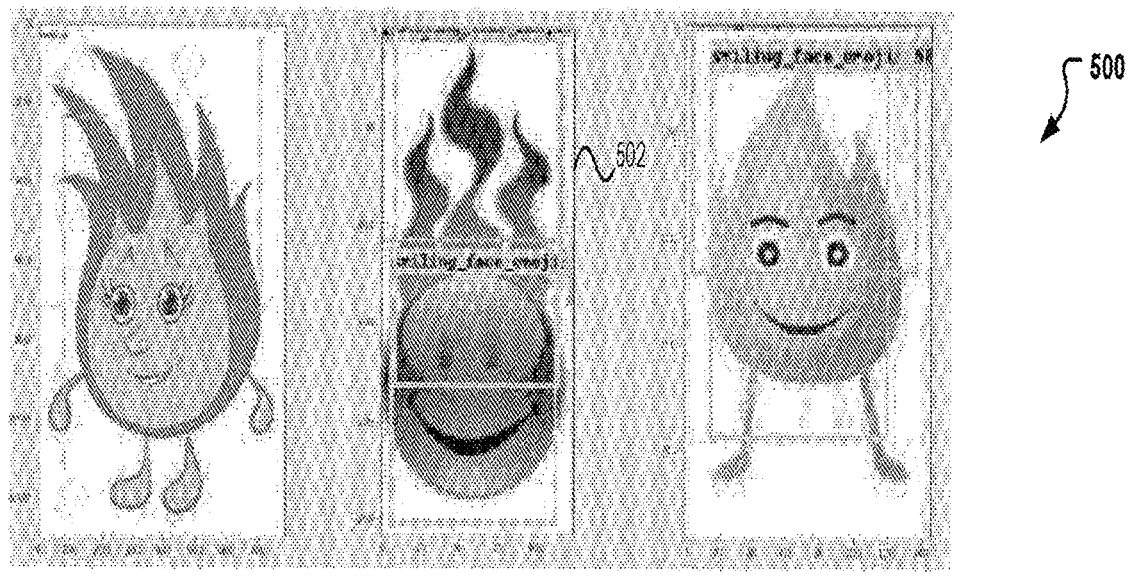
FIGS. 5A-5B illustrate graphical diagrams demonstrating exemplary emoji mashups.
Figure 5B:
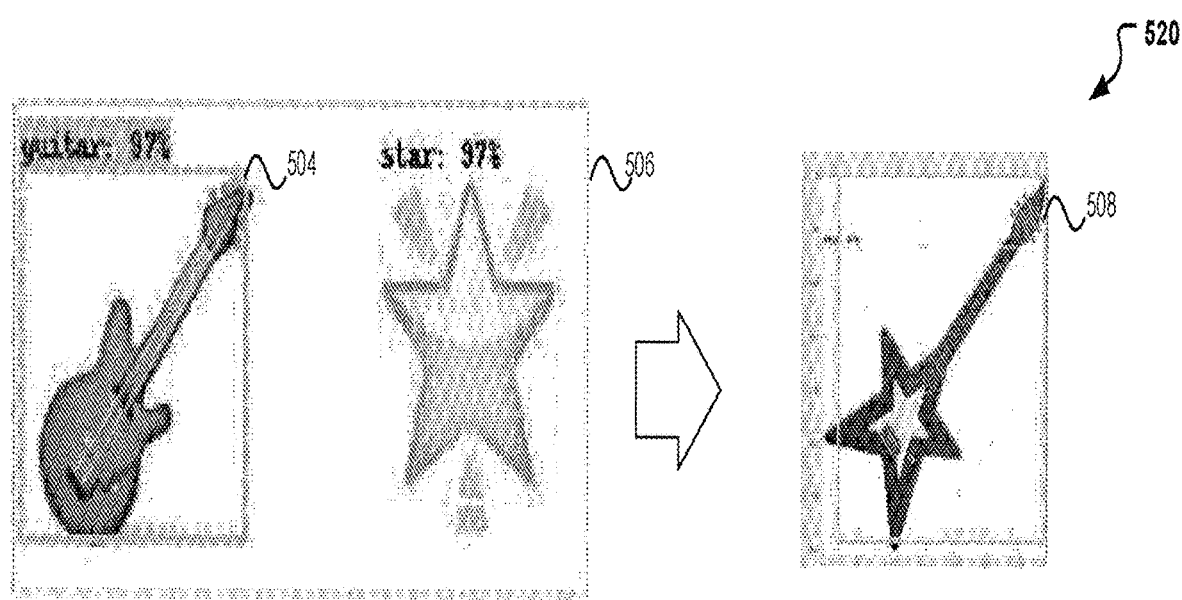

FIGS. 5A-5B illustrate graphical diagrams demonstrating exemplary emoji mashups. In particular, FIG. 5A illustrates three sample smiley face emojis that are merged with the fire emoji. Referring to middle smiley fire emoji 502, note that coordinates for the smiley face and fire emoji are presented and referenced for the placement of the two to generate the emoji mashup 212. FIG. 5B illustrates a guitar emoji 504 and a star emoji 506 and the generation of the rockstar guitar emoji 508. Notice that the guitar emoji 504 and star emoji 506 were presented in response to high data points that may have been determined from the initial training by the machine learning system. Also notice that in this instance, the emojis resulted in a newly generated emoji (e.g., rockstar guitar emoji 508). Note that in some instances, the final emoji maybe a product of the combination of the two or more emojis suggested by the learning system while in other instances, the emojis may be a newly generated emoji defined by the two or more emojis initially identified. The newly generated emoji may be a merger of the two or a previously defined emoji located internally or on an external network. Also note that the emoj is may have been obtained from an external library, repository, database or the like.

Figures 6A, 6B:
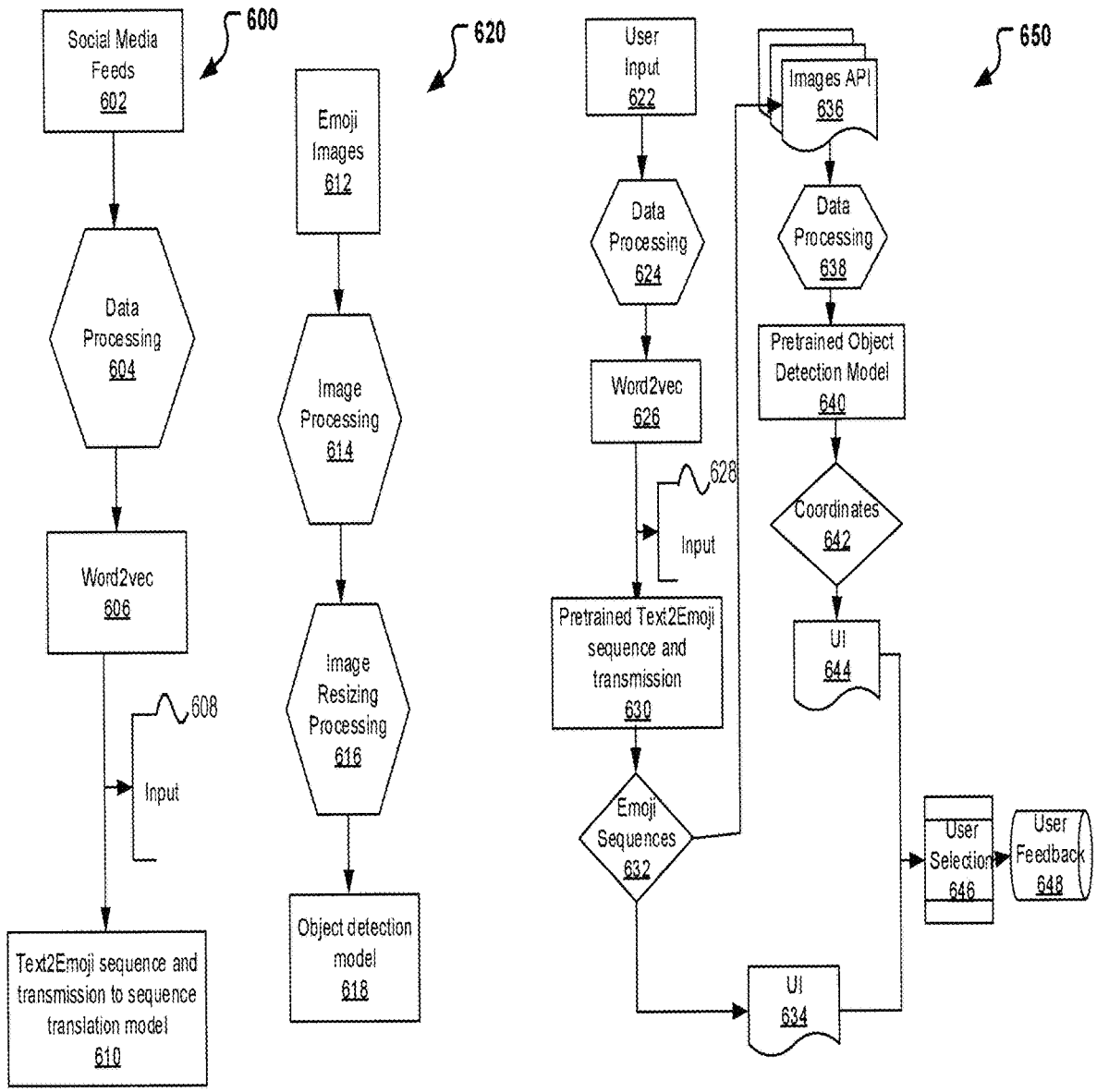
FIGS. 6A-6B illustrate graphical diagrams of training and retrieval processes for generating emoji mashups.
Figure 7A:
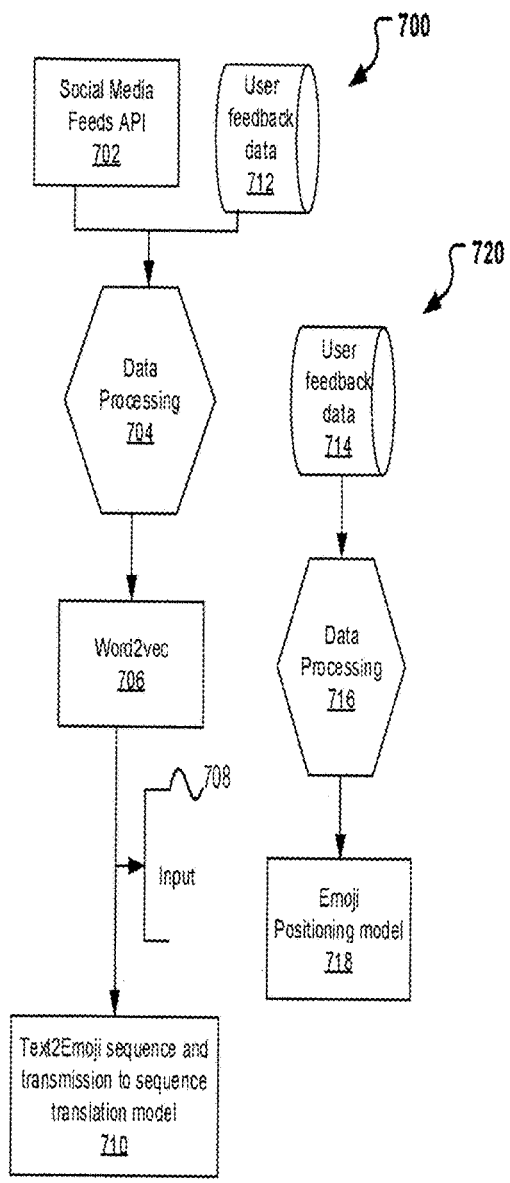
FIGS. 7A-7B illustrate other graphical diagrams of training and retrieval processes for generating emoji mashups.
Figure 7B:
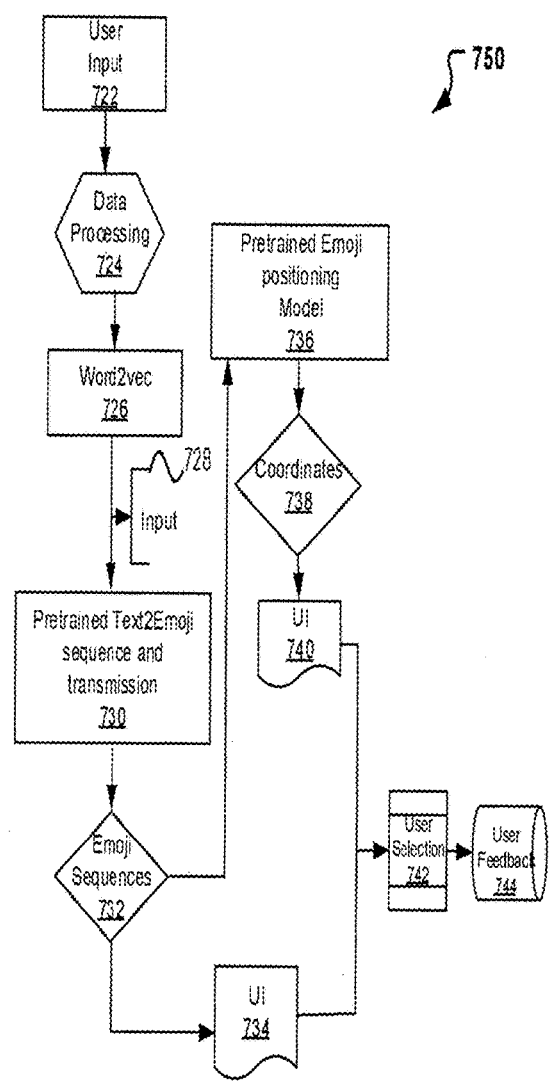

FIGS. 6A-7B illustrate graphical diagrams of training and retrieval processes for generating emoji mashups. FIGS. 6A-6B illustrate early processes where the system may include minimal or no user feedback data that can help train and tailor the emoj is that are suggested. FIGS. 7A-7B illustrate a more mature process where the system is not only using external information (e.g., Twitter® feeds, Google libraries, etc.), but also using internal user feedback to train and present the user 104 with emoji mashup suggestions.

Turning to FIG. 6A, system training is presented, in particular text training process 600 begins with training text sequences (e.g., a text message on a messaging application) for emoji representation. To begin the emoji training process, external sources are used for the retrieval of information. For example, social media feeds 602 (e.g., Twitter feeds) may be collected for the use in training the system. The social media feeds may then go through some data processing 604, where the feeds and other information collected is in preparation for the word2vec conversion 606. As indicated above, word2vec 606 is a training model that may be used to convert words into vectors where part of word2vec 606 entails turning the text into vectors and extracting the text and the emojis. Thus, input 608 word vectors produces the emojis which are used as the labels. This process is performed for the sequences such that a text2emoji sequence is identified in the translation model 610.

FIG. 6A then continues the training process with emoji training process 620 where the emoji images are trained using object detection. In emoji training process 620, the emoji images identified are then processed 614 and resized using the object detection model 618. Note that emoji images are used for exemplary purposes and are not so restricted, as other forms and images may be contemplated.

At FIG. 6B, the runtime process 650 is presented. As illustrated in runtime process 650, begins with the receipt of user input 622. User input can come in the form of a phrase, a sentence, an abbreviation, text, or the like. Oftentimes, the user input will be received at the display of a user device 102 while on an application 216 in communication with one or more other users.

In runtime process 650, like text training process 600, the text is processes and converted using word2vec 626. Next, the information is run against the pre-trained Text2Emoji model 630 which can then output the emoji sequences 632 that are correlated to the input text from the user 104. In some embodiments, the emoji sequences identified can then be presented to the user 104 on the user device UI 634 for user observation and selection 646. Additionally or alternatively, the emoji sequences 632 obtained can are received 636, processed 638, and run against the pre-trained object detection model 640. After the pre-trained object detection model 640, emoji coordinates may be evaluated 642 and extracted and sent to the user UI for user selection. Note that in some instances, the two or more emoji sequences may be presented to the user 104, while in other instances, multiple mashup emojis may already be generated based on the coordinates 642 extracted and presented to the user for user selection 646. After the user 104 has made a selection as to a preferred emoji arrangement, emoji pair, emoji overlay and/or emoji mashup user feedback is stored 648.

As more user preferences and selections are acquired by the system, then user feedback may be used to generate the emoji mashups. For example, in training and runtime processes of FIGS. 7A-7B, a system which includes user feedback is presented. Notice that text training process 700 and emoji training process 720 are very similar to training process 600 and 620 corresponding to FIGS. 6A-6B. As such, the processes descriptions are similar with the exception of user feedback 712, 714, which are now used to train both the text model and the positioning model. Similarly, runtime process 750 of FIG. 7B imitates runtime process 650 of FIG. 6B. Distinct from runtime process 650 however, is the use of positioning model 736 of FIG. 7B. The positioning model was training during emoji training process 720 with the use of user feedback, therefore, at runtime process 750, the pre-trained object detection model 640 is no longer used and instead replaced by the positioning model 736. Once coordinate information 738 is extracted from the emoji sequences again the emojis and coordinates can be presented to the user for user selection 742 and feedback is stored 744.

Note that the process presented is for exemplary purposes and other processes, modeling, and training may be contemplated. In addition, a previously indicated, the system is not restricted to the use of the word2vec model as other machine learning models may be used. Additionally, the system is not restricted to the use of emojis and other forms and types of images may be contemplated.

Figure 8:
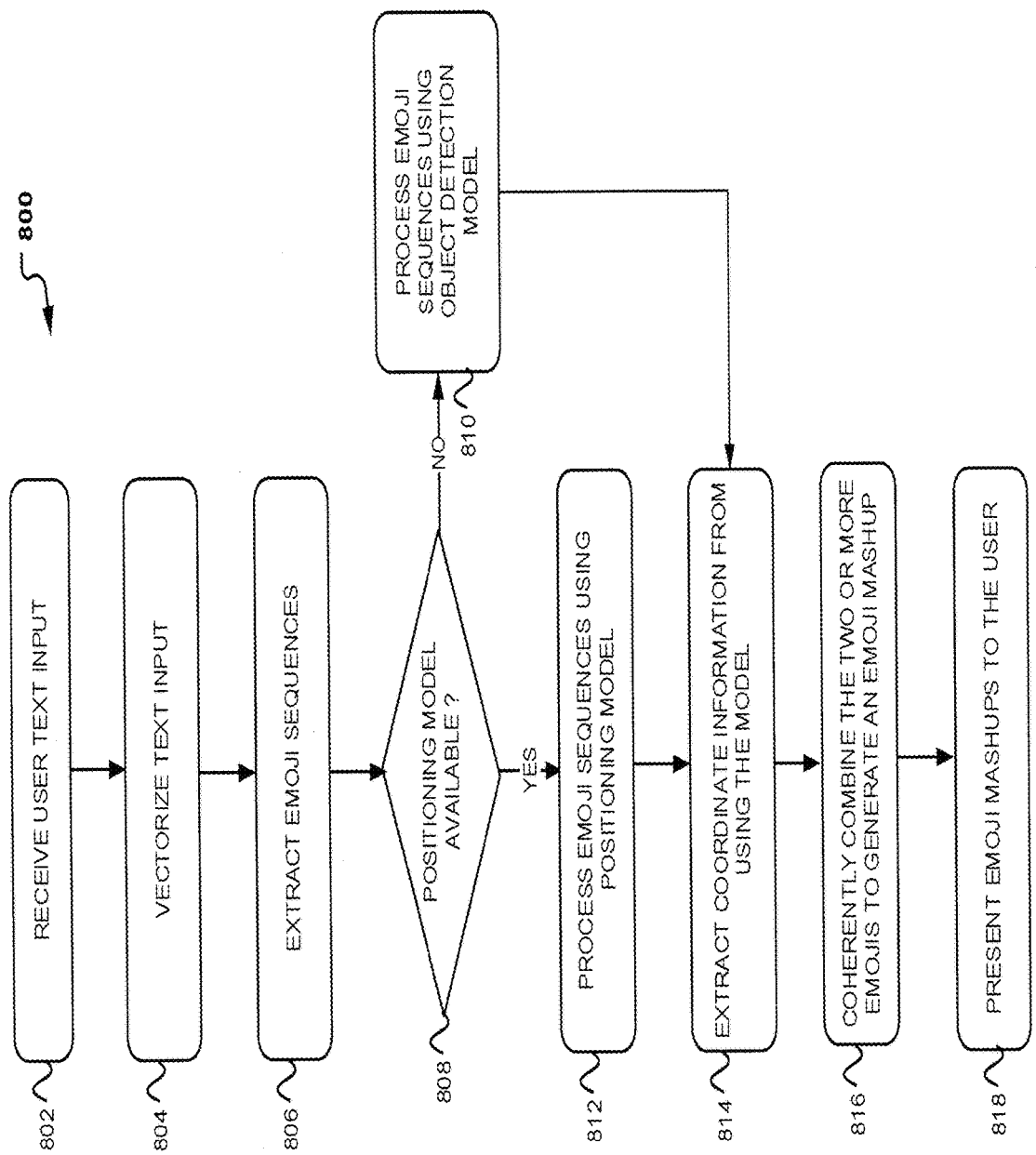
FIG. 8 illustrates a flow diagram illustrating operations for generating emoji mashups.
Figure 9:
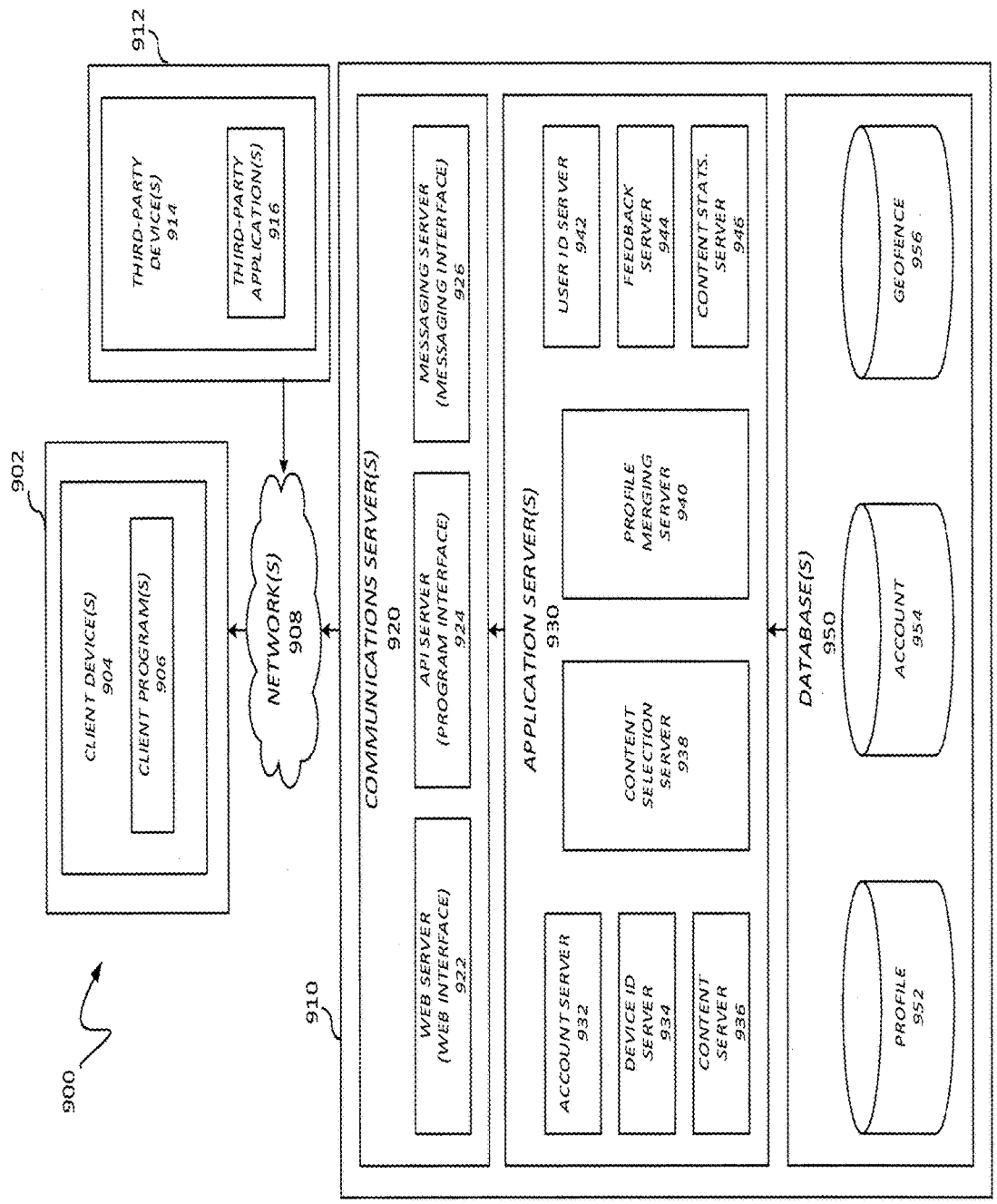
FIG. 9 illustrates a block diagram of a system for generating emoji mashups with machine learning.

FIG. 8 illustrates an example process for generating emoji mashups that may be implemented in on a system, such as system 900 and device 102 in FIGS. 9 and 1 respectively. In particular, FIG. 8 illustrates a flow diagram illustrating operations for receiving a user input and in response presenting the user with emoji mashup suggestions to represent the emotion or idea conveyed in the user input. According to some embodiments, process 800 may include one or more of operations 802-818, which may be implemented, at least in part, in the form of executable code stored on a non-transitory, tangible, machine readable media that, when run on one or more hardware processors, may cause a system to perform one or more of the operations 802-818.

Process 800 may begin with operation 802, where user input is received. The user input may be in the form of a sequence, statement, sentence, phrase or other text. The user input may be input into an application used for transacting, communicating, or interacting with another user. For example, the user input may be at an application like Venmo where a user may send or request a payment to another user with a brief statement and/or emoji regarding the transaction involved.

The user input received is then analyzed for identifying a relevant emoji(s) to present. To analyze the text, at operation 804, the input text is vectorized. Word vectorization may occur using a model such as but not limited to word2vec, where word2vec may be an algorithm that may comprise at least two models that are trained to predict relationships. Thus, in this instance, the user sequence is vectorized corresponding emoji(s) are allocated based on the word. As the entire sequence (user input) is vectorized, the model is trained to extract a series of emoji sequences, in operation 806, that correspond to the context of the sequence input. In some instances, social media networks may be used to identify the sequences and/or emojis for use, while in other instances user selection feedback may exist such that the emojis extracted are retrieved from an existing database or other storage unit. Note that in addition to vectorization, the information may be sent through a sentiment analyzer where clues about the message tone, purpose, and context may be used in the analysis and in identifying the emoji sequences.

If the system model used for extracting the emoji model is mature and sufficient user feedback exists, then a positioning model exists with user preferences and emoji details. As such, at operation 808, a determination is made as to whether a positioning model is available. If the system is still underdeveloped or if a new sequence is identified, the emoji processing may continue further using an object detection model at operation 810. Object detection model may be a model used to detect the emoji sequences extracted from the text input such that coordinate information may be extract from the emojis at operation 814. Alternatively, at operation 812 if the input received is recognized and/or sufficient user feedback exists such that emoji training is not needed, then emoji sequences may be processed through a emoji positing model at operation 812 so that coordinate information may be extracted at operation 814. Once the coordinate information is known at operation 814, then the two or more emojis identified (emoji sequences) may be coherently combined to generate an emoji mashup representative of the input received. The emoji mashup(s) coherently combined may occur at operation 816 where the output mashup emoji(s) may be presented to the user for selection. Note, however, that in some instances, the emoji sequence at operation 806 may additionally or alternatively be presented to the user for the opportunity to combine the emojis by the user.

Note that more or fewer operations may exist in performing method 800. In addition, an operation may exist for determining new emoji or other media object mashup. In addition, the operations are not limited to the training models identified. Further, user selection may be stored for later use by the user and/or another user.

FIG. 9 illustrates, in block diagram format, an example embodiment of a computing environment adapted for implementing a system for generating emoji mashups. As shown, a computing environment 900 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 4 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 900 may include, among various devices, servers, databases and other elements, one or more clients 902 that may comprise or employ one or more client devices 904, such as a laptop, a mobile computing device, a tablet, a PC, a wearable device, and/or any other computing device having computing and/or communications capabilities in accordance with the described embodiments. Client devices 904 may include a cellular telephone, smart phone, electronic wearable device (e.g., smart watch, virtual reality headset), or other similar mobile devices that a user may carry on or about his or her person and access readily.

Client devices 904 generally may provide one or more client programs 906, such as system programs and application programs to perform various computing and/or communications operations. Some example system programs may include, without limitation, an operating system (e.g., MICROSOFT® OS, UNIX® OS, LINUX® OS, Symbian OS™ Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 906 may display various graphical user interfaces (GUIs) to present information to and/or receive information from one or more users of client devices 904. In some embodiments, client programs 906 may include one or more applications configured to conduct some or all of the functionalities and/or processes discussed above and in conjunction FIGS. 1-8.

As shown, client devices 904 may be communicatively coupled via one or more networks 908 to a network-based system 910. Network-based system 910 may be structured, arranged, and/or configured to allow client 902 to establish one or more communications sessions between network-based system 910 and various computing devices 904 and/or client programs 906. Accordingly, a communications session between client devices 904 and network-based system 910 may involve the unidirectional and/or bidirectional exchange of information and may occur over one or more types of networks 908 depending on the mode of communication. While the embodiment of FIG. 9 illustrates a computing environment 900 deployed in a client-server operating relationship, it is to be understood that other suitable operating environments, relationships, and/or architectures may be used in accordance with the described embodiments.

Data communications between client devices 904 and the network-based system 910 may be sent and received over one or more networks 508 such as the Internet, a WAN, a WWAN, a WLAN, a mobile telephone network, a landline telephone network, personal area network, as well as other suitable networks. For example, client devices 904 may communicate with network-based system 910 over the Internet or other suitable WAN by sending and or receiving information via interaction with a web site, e-mail, IM session, and/or video messaging session. Any of a wide variety of suitable communication types between client devices 904 and system 910 may take place, as will be readily appreciated. In particular, wireless communications of any suitable form may take place between client device 904 and system 910, such as that which often occurs in the case of mobile phones or other personal and/or mobile devices.

In various embodiments, computing environment 900 may include, among other elements, a third party 912, which may comprise or employ third-party devices 914 hosting third-party applications 516. In various implementations, third-party devices 514 and/or third-party applications 916 may host applications associated with or employed by a third party 912. For example, third-party devices 914 and/or third-party applications 916 may enable network-based system 910 to provide client 902 and/or system 910 with additional services and/or information, such as merchant information, data communications, payment services, security functions, customer support, and/or other services, some of which will be discussed in greater detail below. Third-party devices 914 and/or third-party applications 916 may also provide system 910 and/or client 902 with other information and/or services, such as email services and/or information, property transfer and/or handling, purchase services and/or information, and/or other online services and/or information.

In one embodiment, third-party devices 914 may include one or more servers, such as a transaction server that manages and archives transactions. In some embodiments, the third-party devices may include a purchase database that can provide information regarding purchases of different items and/or products. In yet another embodiment, third-party severs 914 may include one or more servers for aggregating consumer data, purchase data, and other statistics.

Network-based system 910 may comprise one or more communications servers 920 to provide suitable interfaces that enable communication using various modes of communication and/or via one or more networks 908. Communications servers 920 may include a web server 922, an API server 924, and/or a messaging server 926 to provide interfaces to one or more application servers 930. Application servers 930 of network-based system 910 may be structured, arranged, and/or configured to provide various online services, merchant identification services, merchant information services, purchasing services, monetary transfers, checkout processing, data gathering, data analysis, and other services to users that access network-based system 910. In various embodiments, client devices 904 and/or third-party devices 914 may communicate with application servers 930 of network-based system 910 via one or more of a web interface provided by web server 922, a programmatic interface provided by API server 924, and/or a messaging interface provided by messaging server 926. It may be appreciated that web server 922, API server 924, and messaging server 526 may be structured, arranged, and/or configured to communicate with various types of client devices 904, third-party devices 914, third-party applications 916, and/or client programs 906 and may interoperate with each other in some implementations.

Web server 922 may be arranged to communicate with web clients and/or applications such as a web browser, web browser toolbar, desktop widget, mobile widget, web-based application, web-based interpreter, virtual machine, mobile applications, and so forth. API server 924 may be arranged to communicate with various client programs 906 and/or a third-party application 916 comprising an implementation of API for network-based system 910. Messaging server 926 may be arranged to communicate with various messaging clients and/or applications such as e-mail, IM, SMS, MMS, telephone, VoIP, video messaging, IRC, and so forth, and messaging server 926 may provide a messaging interface to enable access by client 902 and/or third party 912 to the various services and functions provided by application servers 930.

Application servers 930 of network-based system 910 may be a server that provides various services to clients including, but not limited to, data analysis, geofence management, order processing, checkout processing, and/or the like. Application server 930 of network-based system 910 may provide services to a third party merchants such as real time consumer metric visualizations, real time purchase information, and/or the like. Application servers 930 may include an account server 932, device identification server 934, payment server 936, content selection server 938, profile merging server 940, user ID server 942, feedback server 954, and/or content statistics server 946. Note that any one or more of the serves 932-946 may be used in storing and/or retrieving emojis, user feedback, coordinates, emoji positioning, etc. For example, user selections may be stored in feedback server 944. These servers, which may be in addition to other servers, may be structured and arranged to configure the system for monitoring queues and identifying ways for reducing queue times.

Application servers 930, in turn, may be coupled to and capable of accessing one or more databases 950 including a profile database 952, an account database 954, geofence database 956, and/or the like. Databases 950 generally may store and maintain various types of information for use by application servers 930 and may comprise or be implemented by various types of computer storage devices (e.g., servers, memory) and/or database structures (e.g., relational, object-oriented, hierarchical, dimensional, network) in accordance with the described embodiments.

Figure 10:
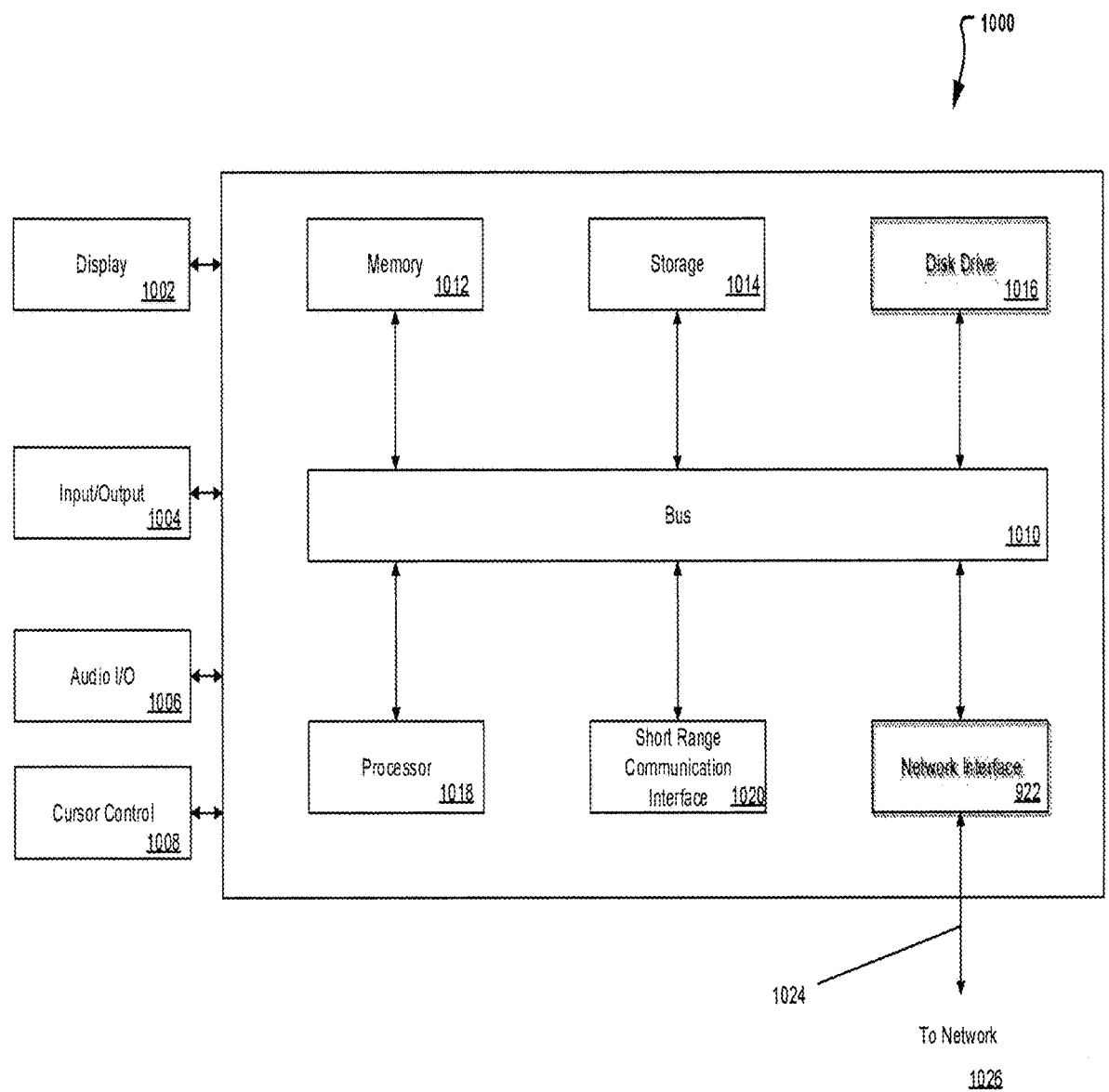
FIG. 10 illustrates an example block diagram of a computer system suitable for implementing one or more devices of the communication systems of FIGS. 1-9.

FIG. 10 illustrates an example computer system 1000 in block diagram format suitable for implementing on one or more devices of the system in FIGS. 1-9. In various implementations, a device that includes computer system 1000 may comprise a personal computing device (e.g., a smart or mobile device, a computing tablet, a personal computer, laptop, wearable device, PDA, user device 102, etc.) that is capable of communicating with a network 926 (e.g., networks 208,210). A service provider and/or a content provider may utilize a network computing device (e.g., a network server) capable of communicating with the network. It should be appreciated that each of the devices utilized by users, service providers, and content providers may be implemented as computer system 1000 in a manner as follows.

Additionally, as more and more devices become communication capable, such as new smart devices using wireless communication to report, track, message, relay information and so forth, these devices may be part of computer system 1000. For example, windows, walls, and other objects may double as touch screen devices for users to interact with. Such devices may be incorporated with the systems discussed herein.

Computer system 1000 may include a bus 1010 or other communication mechanisms for communicating information data, signals, and information between various components of computer system 1000. Components include an input/output (I/O) component 1004 that processes a user action, such as selecting keys from a keypad/keyboard, selecting one or more buttons, links, actuatable elements, etc., and sending a corresponding signal to bus 1010. I/O component 1004 may also include an output component, such as a display 1002 and a cursor control 1008 (such as a keyboard, keypad, mouse, touchscreen, etc.). In some examples, I/O component 1004 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 1018, which may be a micro-controller, digital signal processor (DSP), or other processing component, that processes these various signals, such as for display on computer system 1000 or transmission to other devices over a network 1026 via a communication link 1024. Again, communication link 1024 may be a wireless communication in some embodiments. Processor 1018 may also control transmission of information, such as cookies, IP addresses, images, and/or the like to other devices.

Components of computer system 1000 also include a system memory component 1012 (e.g., RAM), a static storage component 1014 (e.g., ROM), and/or a disk drive 1016. Computer system 1000 performs specific operations by processor 1018 and other components by executing one or more sequences of instructions contained in system memory component 1012 (e.g., text processing and emoji processing). Logic may be encoded in a computer readable medium, which may refer to any medium that participates in providing instructions to processor 1018 for execution. Such a medium may take many forms, including but not limited to, non-volatile media, volatile media, and/or transmission media. In various implementations, non-volatile media includes optical or magnetic disks, volatile media includes dynamic memory such as system memory component 1012, and transmission media includes coaxial cables, copper wire, and fiber optics, including wires that comprise bus 1010. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 1000 may also include a short range communications interface 1020. Short range communications interface 1020, in various embodiments, may include transceiver circuitry, an antenna, and/or waveguide. Short range communications interface 1020 may use one or more short-range wireless communication technologies, protocols, and/or standards (e.g., WiFi, Bluetooth®, Bluetooth Low Energy (BLE), infrared, NFC, etc.).

Short range communications interface 1020, in various embodiments, may be configured to detect other devices (e.g., device 102, secondary user device, etc.) with short range communications technology near computer system 1000. Short range communications interface 1020 may create a communication area for detecting other devices with short range communication capabilities. When other devices with short range communications capabilities are placed in the communication area of short range communications interface 1020, short range communications interface 1020 may detect the other devices and exchange data with the other devices. Short range communications interface 1020 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 1020 may identify a local area network using a short range communications protocol, such as WiFi, and join the local area network. In some examples, computer system 1000 may discover and/or communicate with other devices that are a part of the local area network using short range communications interface 1020. In some embodiments, short range communications interface 1020 may further exchange data and information with the other devices that are communicatively coupled with short range communications interface 1020.

In various embodiments of the present disclosure, execution of instruction sequences to practice the present disclosure may be performed by computer system 1000. In various other embodiments of the present disclosure, a plurality of computer systems 1000 coupled by communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 1024 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
one or more hardware processors coupled to the non-transitory memory and configured to read the instructions from the non-transitory memory to cause the system to perform operations comprising:
extracting a plurality of emojis from a string of text received from a user via a user interface;
obtaining coordinate information for each emoji in the plurality of emojis within the string of text;
determining corresponding centers of at least two emojis in the plurality of emojis using the coordinate information;
determining, using a machine learning model, a combination of the at least two emojis in the plurality of emojis based on the coordinate information and the corresponding centers;
merging, based at least in part on the coordinate information and the combination of the at least two emojis in the plurality of emojis and using a matchmaking logic, the at least two emojis from the plurality of emojis into an emoji mashup, wherein the emoji mashup comprises a single emoji image for a manner in which the at least two emojis are merged into the emoji mashup based on at least the corresponding centers of the at least two emojis in the plurality of emojis; and
presenting, on the user interface, the emoji mashup.

2. The system of claim 1, wherein the determining the corresponding centers of the at least two emojis in the plurality of emojis is based on a center of mass analysis of each of the at least two emojis.

3. The system of claim 1, wherein the merging the at least two emojis comprises determining, using the matchmaking logic, a relative position of the at least two emojis within the string of text based on the corresponding centers for each of the at least two emojis.

4. The system of claim 1, wherein the operations further comprise obtaining a scale for the at least two emojis in the plurality of emojis, and wherein the merging the at least two emojis comprises adjusting a relative size of one or more of the at least two emojis based on the scale for each emoji in the at least two emojis.

5. The system of claim 1, wherein the matchmaking logic merges the at least two emojis based on a selection of the at least two emojis from the plurality of emojis using the machine learning model.

6. A method comprising:
extracting, by one or more hardware processors, a plurality of emojis from a string of text received from a user via a user interface;
obtaining, by the one or more hardware processors, coordinate information for at least two emojis in the plurality of emojis within the string of text;
determining, by the one or more hardware processors, corresponding centers of the at least two emoji in the plurality of emojis using the coordinate information;
determining, by the one or more hardware processors using a machine learning model, a combination of emojis in the plurality of emojis based on the coordinate information and the corresponding centers;

merging, by the one or more hardware processors based at least in part on the coordinate information and the combination of the at least two emojis in the plurality of emojis and using a matchmaking logic, the at least two emojis from the plurality of emojis into an emoji mashup, wherein the emoji mashup comprises a single emoji image for a manner in which the at least two emojis are merged into the emoji mashup based on at least the corresponding centers of the at least two emojis in the plurality of emojis; and presenting, by the one or more hardware processors on the user interface, the emoji mashup.

7. The method of claim 6, wherein the determining the corresponding centers of the at least two emojis in the plurality of emojis is based on a center of mass analysis of each of the at least two emojis.

8. The method of claim 6, wherein the merging the at least two emojis comprises determining, using the matchmaking logic, a relative position of the at least two emojis within the string of text based on the corresponding centers for each of the at least two emojis.

9. The method of claim 6, further comprising obtaining a scale for the at least two emojis in the plurality of emojis, and wherein the merging the at least two emojis comprises adjusting a relative size of one of the at least two emojis based on the scale for each emoji in the at least two emojis.

10. The method of claim 6, wherein the matchmaking logic merges the at least two emojis based on a selection of the at least two emojis from the plurality of emojis using the machine learning model.

11. A non-transitory machine-readable medium having stored thereon machine readable instructions executable to cause a machine to perform operations comprising:

extracting a plurality of emojis from a string of text received from a user via a user interface;

obtaining coordinate information for at least two emojis in the plurality of emojis;

determining corresponding centers of the at least two emojis in the plurality of emojis using the coordinate information;

determining, using a machine learning model, a combination of the at least two emojis in the plurality of emojis based on the coordinate information and the corresponding centers;

merging, based at least in part on the coordinate information and the combination of the at least two emoji in the plurality of emojis and using a matchmaking logic, the at least two emojis from the plurality of emojis into an emoji mashup, wherein the emoji mashup comprises a single emoji icon for a manner in which the at least two emojis are merged into the emoji mashup based on at least the corresponding centers of the at least two emojis in the plurality of emojis; and presenting, on the user interface, the emoji mashup.

12. The non-transitory machine-readable medium of claim 11, wherein the determining the corresponding centers of the at least two emojis is based on a center of mass analysis of each of the at least two emojis.

13. The non-transitory machine-readable medium of claim 11, wherein combining the at least two emojis comprises determining, using the matchmaking logic, a relative position of the at least two emojis within the string of text based on the corresponding centers for each of the at least two emojis.

14. The non-transitory machine-readable medium of claim 11, wherein the operations further comprise obtaining a scale for the at least two emojis in the plurality of emojis, and wherein the merging the at least two emojis comprises adjusting a relative size of one of the at least two emojis based on the scale for each emoji in the at least two emojis.

* * * * *